United States Patent [19]

van der Lely

[11] 4,043,401
[45] Aug. 23, 1977

[54] SOIL CULTIVATING IMPLEMENTS

[76] Inventor: Cornelis van der Lely, 7, Bruschenrain, Zug, Switzerland

[21] Appl. No.: 596,826

[22] Filed: July 17, 1975

[30] Foreign Application Priority Data

July 18, 1974 Netherlands .......................... 7409705

[51] Int. Cl.² .................... A01B 33/06; A01B 71/08
[52] U.S. Cl. ................................. 172/59; 172/706;
172/711; 172/713; 172/762; 172/765;
403/DIG. 4; 172/49; 172/68; 172/96; 172/111;
172/125; 172/543; 172/685
[58] Field of Search ..................... 172/49-52,
172/56-60, 91, 96, 108, 111, 123, 125, 522-526,
543, 545, 685, 700, 705-708, 711, 713, 714, 748,
762, 765, 766

[56] References Cited

U.S. PATENT DOCUMENTS

| | | | |
|---|---|---|---|
| 135,664 | 2/1873 | Poundstone | 172/523 |
| 2,034,779 | 3/1936 | Storey | 172/59 |
| 2,873,808 | 2/1959 | Rome | 172/529 |
| 3,616,862 | 11/1971 | van der Lely | 172/59 X |
| 3,821,989 | 7/1974 | van der Lely et al. | 172/59 |

FOREIGN PATENT DOCUMENTS

| | | | |
|---|---|---|---|
| 545,002 | 6/1956 | Italy | 172/111 |
| 158,746 | 3/1964 | U.S.S.R. | 172/59 |

Primary Examiner—Paul E. Shapiro
Attorney, Agent, or Firm—Mason, Mason & Albright

[57] ABSTRACT

A cultivating implement has side-by-side soil working members journalled in a hollow frame portion. Each member includes a support with hub that is connected to the lower end of a corresponding shaft. The shafts of the soil working members have meshed pinions on their upper ends that are housed in an upper chamber of the frame portion. The support and hub are housed substantially in their entireties within the frame portion and the lower side of each hub has apertured tags with pins that comprise quick release fastenings for downwardly extending tines.

14 Claims, 5 Drawing Figures

SOIL CULTIVATING IMPLEMENTS

Figure 1:
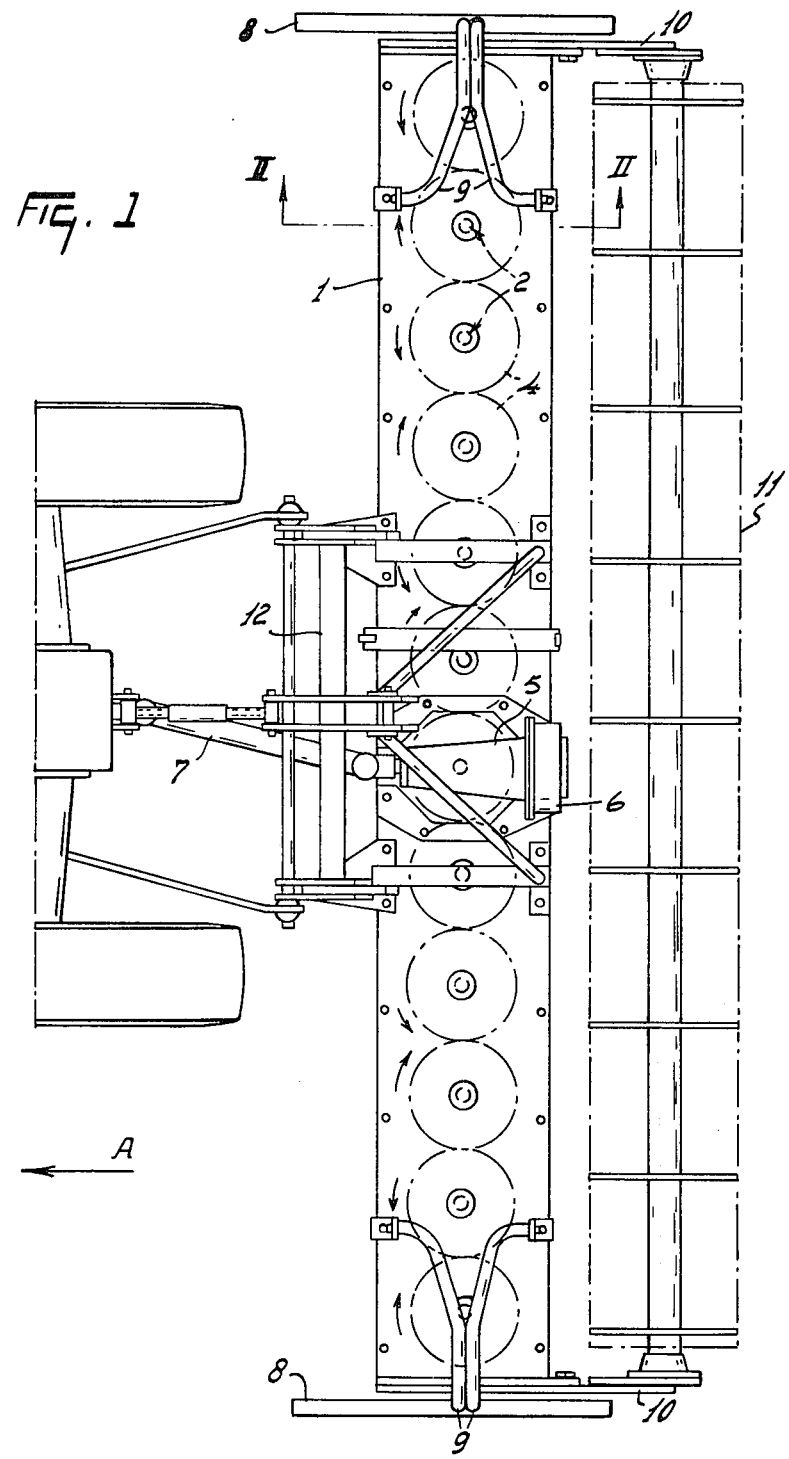
Figure 2:
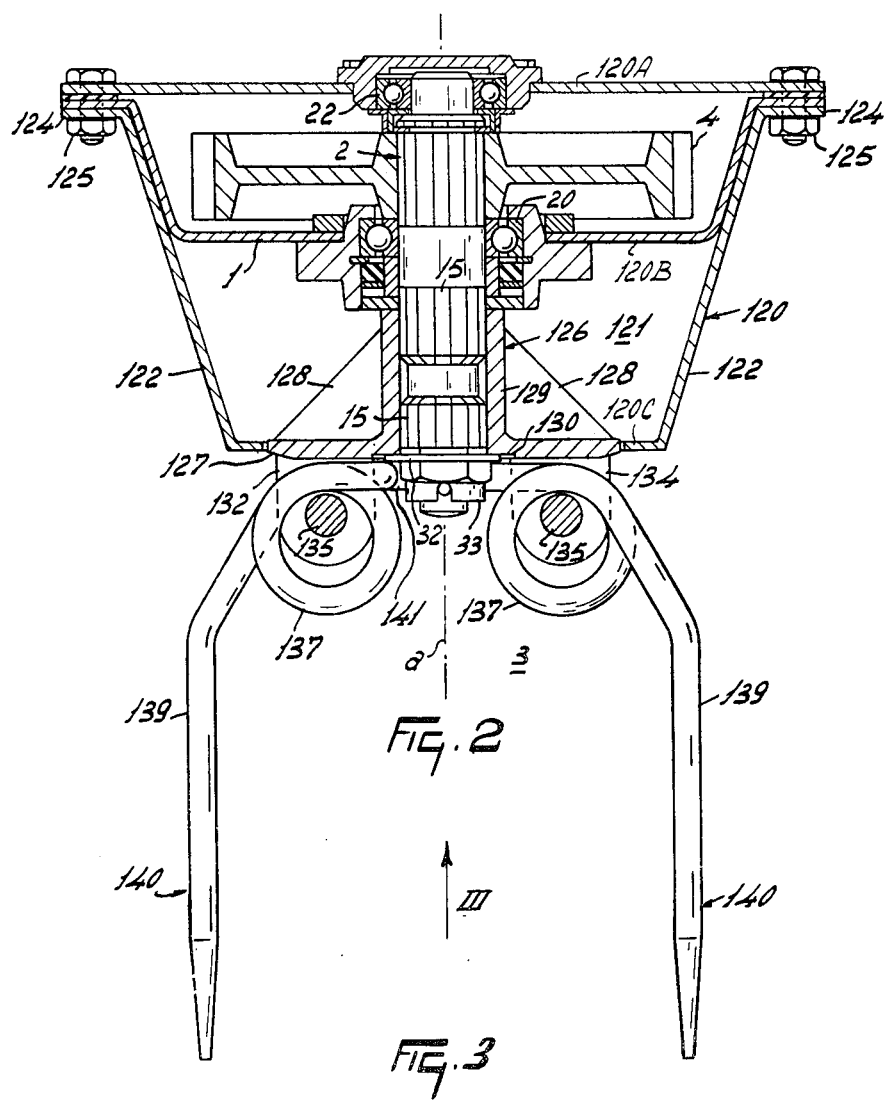
Figure 3:
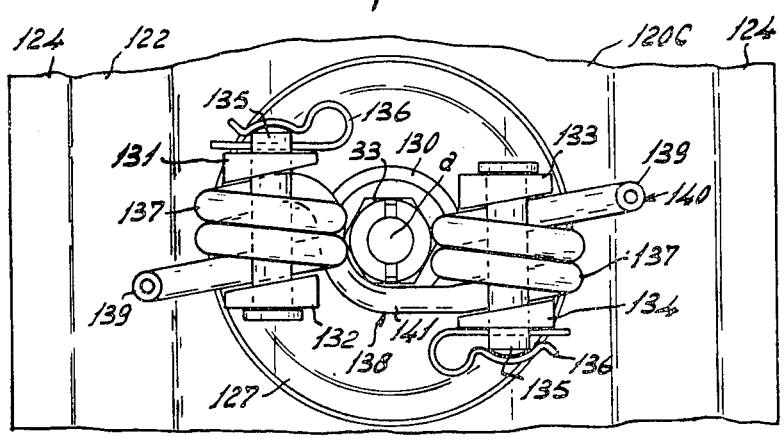
Figure 4:
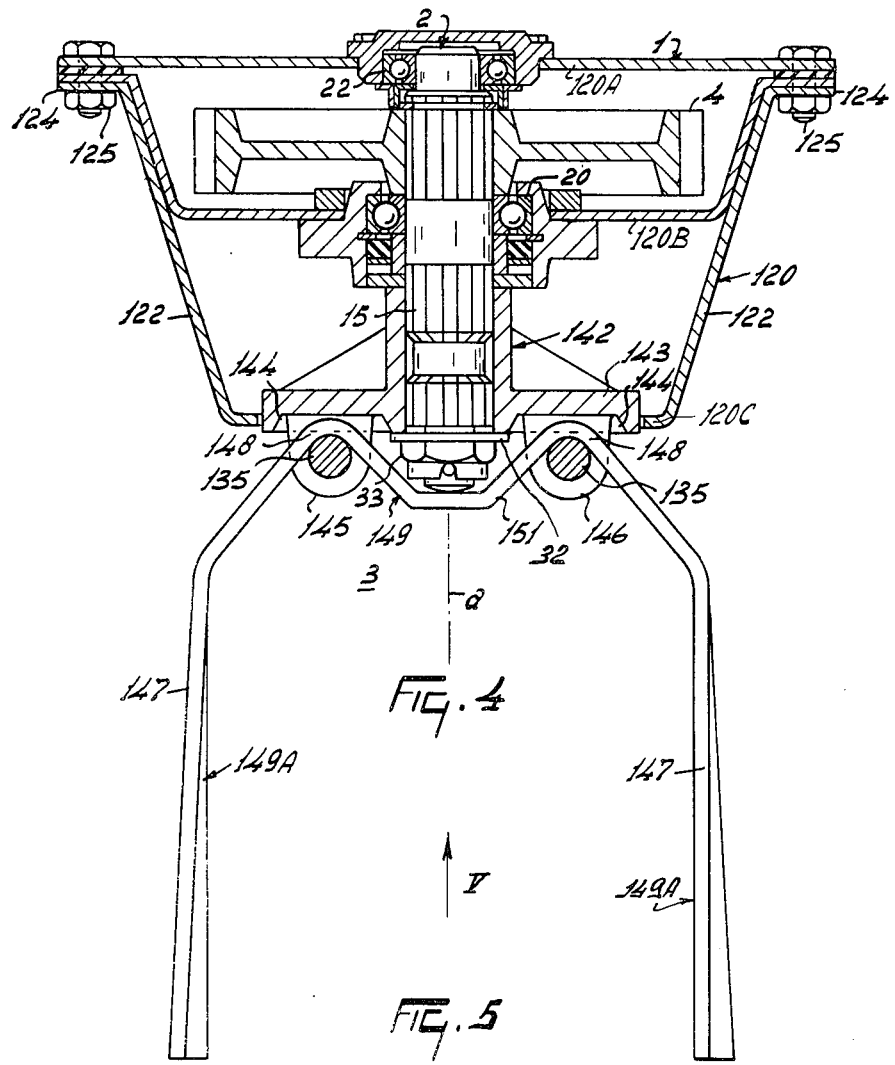
Figure 5:
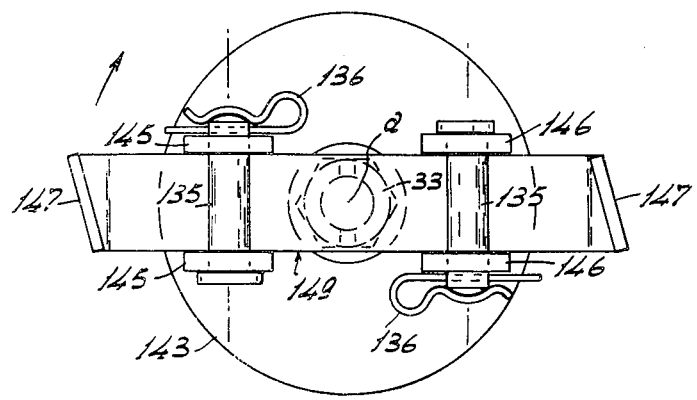

For a better understanding of the invention, and to show how the same may be carried into effect, reference will now be made, by way of example, to the accompanying drawings, in which:

FIG. 1 is a plan view of a soil cultivaing implement or rotary harrow in accordance with the invention connected to the rear of an agricultural tractor, FIG. 2 is a section, to an enlarged scale, taken on the line II—II in FIG. 1, FIG. 3 is an underneath plan view as seen in the direction indicted by an arrow III in FIG. 2, FIG. 4 is a section, to an enlarged scale, taken on the line II—II in FIG. 1 but illustrates an alternative construction, and FIG. 5 is an underneath plan view as seen in the direction indicated by an arrow V in FIG. 4.

Referring to FIGS. 1 to 3 of the drawings, the soil cultivatng implement that is illustrated is in the form of a rotary harrow which has a hollow boxshaped frame portion or casing 1 that extends substantially horizontally transverse, and normally substantially hroizontally perpendicular, to the intended direction of operative travel of the implement which is indicated by an arrow A in FIG. 1 of the drawings. A plurality, in this case twelve, of soil working members are rotatably mounted beneath the frame portion 1 at the lower ends of corresponding upright, and normally vertical or substantially vertical, shafts 2. The twelve shafts 2 are arranged in a single row in regularly spaced apart relatonship, the distance between the axes of each pair of immediately neighbouring shafts 2 preferably being substantially 25 centimeters but not being greater than substantially 30 centimeters. Each shaft 2 is provided, inside the hollow frame portion 1, with a corresponding straight- or spur-toothed pinion 4, the teeth of each pinion 4 being in mesh with those of its neighbour, or both of its neighbours, in the single row thereof so that all of the soil working members are drivingly interconnected in such a way that each of those members will rotate in the opposite direction to its immediate neighbour, or to both of its immediate neighbours, in the single row as indicated by arrows in FIG. 1 of the drawings. One of the center pair of the row of twelve shafts 2 has an upward extension into a gear box 5 which is mounted on top of the hollow frame portion 1. The shaft extension is provided, inside the gear box 5, with a bevel pinion whose teeth are in mesh with those of a further bevel pinion carried by a substantially horizontal shaft (not visible) that extends substantially horizontally parallel to the directon A. The rearmost end of the substantially horizontal shaft and the rearmost end of an overlying shaft that is parallel thereto both project through a rear wall of the gear box 5 and into a change-speed gear 6. The rear ends of the two parallel substantially horizontal shafts that project into the changespeed gear 6 are splined and can receive chosen pairs of co-operating straight- or spur-toothed pinions, those pinions being selected from a number of pairs of interchangeable and/or exchangeable pinions. The particular pair of pinions that is chosen gives a corresponding transmission ratio between the two substantially horizontal shafts and different speeds of rotation of the soil working members can thus be selected by an appropriate choice of pinions without having to alter the input speed of rotaton that is applied to the gear box 5. The leading end, with respect to the directon A, of the upper substantially horizontal shaft projects forwardly from the front of the gear box 5 and is there splined or otherwise keyed to enable it to be placed in driven connection with the power take-off shaft of an agricultural tractor or other operating vehicle by using an intermediate telescopic transmission shaft 7 that is of a construction which is known per se having universal joints at its opposite ends. This arrangement is shown in outline in FIG. 1 of the drawings.

Two normally substantially vertically disposed shield plates 8 are arranged immediately beyond the opposite ends of the row of soil working members, said shield plates 8 both extending substantially parallel to the direction A. Each shield plate 8 is secured to a corresponding pair of arms 9 and the ends of those arms 9 that are remote from the shield plate 8 concerned are pivotably connected to brackets mounted on top of the hollow frame portion 1, the pivotal connections between said arms and said brackets defining an axis that extends substantially horizontally parallel to the direction A. The lowermost edges of the shield plates 8 are constructed and arranged for sliding motion over the ground surface in substantially the direction A and their pivotal connection to the frame portion 1 by way of the arms 9 enables them to turn upwardly and downwardly about the axes defined by those pivotal connections to match undulations in the surface of the ground that are met with during progress in the direction A. The opposite ends of the frame portion 1 are closed by substantially vertical plates that extend substantially parallel to the direction A and arms 10 are turnable upwardly and downwardly alongside those plates about substantially horizontally aligned pivots (not visible) that are located at substantially the tops of the end plates and substantially the fronts thereof with respect to the direction A. Rearmost edge regions of the end plates of the frame portion 1 are formed with arcuately curved slots, or with alternative arcuately curved rows of holes, the centres of curvature of the slots or rows of holes being coincident with the axis that is defined by the strong pivots which connect the arms 10 to the frame portion 1. The arms 10 are formed with single holes that register with the slots, or that can register with chosen ones of the alternative holes, and bolts whose heads can be seen in FIG. 1 of the drawings are entered through the single holes in the arms 10 and through the slots or holes in the end plates, the bolts being capable of being tightened to retain the arms 10 in corresponding angular settings about their pivotal connection to the frame portion 1. A rotatable supporting member in the form of an open ground roller 11 is rotatably mounted between rearmost and lowermost ends of brackets that are carried by the arms 10, said roller 11 extending substantially horizontally parallel to the transverse length of the frame portion 1 and throughout substantially the whole of the strip of land that is displaced by the soil working members during the operation of the implement. The angular settings of the arms 10 that are chosen relative to the hollow frame portion 1 dictate the level of the axis of rotation of the roller 11 relative to that of the remainder of the implement and thus control the depth to which tines of the soil working members can penetrate into the soil when the implement is in operation. A coupling member or trestle 12 of generally triangular configuration is secured to the front of the hollow frame portion 1 with respect to the direction A and is constructed and arranged to enable the implement to be connected to the threepoint lifting device or hitch of an agricultural tractor or other operating vehicle in the generally known manner which is illustrated in outline in FIG. 1 of the drawings.

It will be seen from FIGS. 2 and 3 of the drawings that the bottom of the hollow frame portion 1 has a wall 120 in the form of a lower metal plate secured to it, said wall 120 assisting in defining a chamber 121. The frame portion 1 has a top cover 120A, an underlying central plate 120B of substantially channel-shaped crosssection and a lower plate 120C in the form of a substantially horizontally disposed central region (considered in the direction A) of the wall 120. Each of the shafts 2, of which only one is shown in FIGS. 2 and 3 of the drawings, is supported in the top cover 120A by an upper ball bearing 22 and in the central plate 120B by a lower ball bearing 20, the lower ball bearing 20 being arranged substantially midway along the upright length of the shaft 2. In addition to the lower plate 120C of the wall 120, that wall comprises front and rear upwardly and outwardly inclined flat portions 122 whose upper edges are bent over substantially horizontally to form front and rear rims 124. Small vertical bolts 125 that are arranged at more or less regular intervals along the rims 124 firmly but releasably secure those rims to superposed rims of the central plate 120B and to front and rear edge regions of the top cover 120A, a gasket being provided between the rims of the plate 120B and the overlying edge regions of the top cover 120A substantially to prevent leakage of lubricant from the upper chamber of the frame portion 1 in which the pinions 4 are located. Each shaft 2 has a lower splined portion 15 which is interrupted by a plain part having no splines that is provided to facilitate manufacture. A support that is generally indicated by the reference 126 has an internally splined hub 129 and that hub is slid onto the co-operating splines of the shaft portion 15. The lowermost end of the hub 129 is formed with an integral circular flange 127 that is located, with minimal clearance, in a corresponding hole formed in the lower plate 120C. A plurality of generally triangular stiffening ribs 128 rigidly interconnect the upper surface of the flange 127 and the outer curved surface of the hub 129 inside the chamber 121. The support 126 is fixed axially in position on the lower splined portion 15 of the shaft 2 by a locking washer 32 and a co-operating fastening nut 33, the washer 32 being located in a shallow recess 130 in the lower surface of the flange 127 and the internal screwthread of the nut 33 co-operating with the external screwthread of a stub shaft that is formed integrally with the shaft 2 at the lowermost end of the latter. As can be seen in FIGS. 2 and 3 of the drawings, a transverse split pin or the like is entered through the nut 33 and the screwthreaded stub shaft to prevent the fastening nut 33 from working loose during operation.

The lower surface of the flange 127 of the support 126 is provided at opposite sides of the recess 130 with two pairs of spaced lugs or tags 131, 132 and 133, 134 respectively. Each pair of tags is formed with horizontally aligned holes and headed pins 135 are entered through the corresponding pairs of holes. The ends of the pins 135 that are remote from the heads are formed with small transverse bores and straight limbs of resilient "safety" pins 136 are entered through those bores to prevent axial disengagement of the pins 135 from the tags 131, 132 and 133, 134. Multiple coils 137 are wound around the two pins 135, between the tags of the corresponding pair, said coils 137 forming parts of corresponding soil working tines 140 and being wound around the pins 135 with a significant degree of clearance (see particularly FIG. 2). It can be seen from FIG. 3 of the drawings that the pair of tags 131, 132 is offset relative to the axis of rotation $a$ with respect to the other pair of tags 133, 134, the axis of rotation $a$ of the soil working member concerned being embodied in the corresponding shaft 2 and being coincident with the longitudinal axis of that shaft. One end of each coil 137 merges into an operative portion 139 of the corresponding tine 140 while its opposite end merges integrally into a fastening portion 138 which is common to the two tines 140. The fastening portion 138 comprises a connecting part 141 some of the length of which is arcuately curved in such a way that the centre of curvature thereof substantially coincides with the axis of rotation $a$. As seen in underneath plan view (FIG. 3) the connecting part 141 of the fastening portion 138 is of approximately shallow S-shaped configuration. Opposite ends of the coils 137 are in contact with slanting inner faces of the tags 131, 132 and 133, 134 respectively. As will be evident from FIG. 2 of the drawings, the clearance between the coils 137 and the corresponding pins 135 is particularly marked beneath those pins. The ends of the coils 137 that are remote from the fastening portion 138 merge into straight, downwardly and soutwardly inclined parts of the two operative portions 139 of the tines 140, those parts being integrally connected by bends to downwardly directed parts that are both substantially parallel to the axis $a$ and that both terminate at their lower ends in tapered points or tips. Each integral assembly of two tines 140 and the corresponding fastening portion 138 is formed from a single length of substantially circular cross-section spring steel rod.

In the alternative embodiment that is illustrated in FIGS. 4 and 5 of the drawings, the lower splined portion 15 of each shaft 2 co-operates with the internal splines of the hub of a corresponding support 142. Each support 142 has a circular flange 143 at its lower end and is retained in its appointed axial position on the shaft 2 by the locking washer 32 and fastening nut 33 as in the preceding embodiment. Once again, the circular flange 143 of the support 142 is located, with minimal clearance, in a corresponding circular hole formed in the lower plate 120C of the wall 120. The lower surface of the flange 143 is formed with two diametrically opposed recesses 144 which house corresponding pairs of downwardly directed lugs or tags 145 and 146. As will be evident from FIG. 5 of the drawings, in this embodiment, the two tags 145 are not offset relative to the axis of rotation $a$ with respect to the other pair of tags 146 as is the arrangement in the embodiment that has been described with reference to FIGS. 2 and 3 of the drawings. The tags 145 and 146 again support the pins 135 but, in this case, they are partially surrounded by curved tine parts 148 that are elements of a common tine fastening portion 149 which integrally interconnects two tines 149A. The two tines 149A and their fastening portion 149 are formed from a single length of strip-shaped leaf spring steel. As can be seen in FIG. 4 of the drawings, the parts 148 partially surround the pins 135 in such a way that some clearance therebetween is possible. In both this embodiment and the preceding embodiment, the pins 135 and the co-operating resilient "safety" pins 136 constitute quick release fastenings for the tines 149A and 140 respectively. The curved tine parts 148 are integrally interconnected by a downwardly bent over part 151 of the fastening portion 149, said part 151 covering the fastening nut 33 and its co-operating screwthreaded stub shaft from beneath. Each tine 149A comprises an operative portion 147 which has a first straight, downwardly and outwardly inclined part that is directly coupled to the corresponding curved part 148, said straight part being integrally connected by a bend at its lowermost end to a further straight part that extends downwardly in nearly parallel relationship with the axis $a$ but in such a way that its lowermost free end or tip is slightly further from that axis than is its uppermost end. The leaf spring steel from which each assembly 149/149A is made has a thickness of not less than substantially 5 millimeters and a width of not less than substantially 50 millimeters and it will be seen from FIGS. 4 and 5 of the drawings that the straight parts of the operative portions 147 that are nearly parallel to the axis $a$ are torsionally twisted about their own longitudinal axes in such a way that, with respect to the intended direction of operative rotation of the soil working member concerned (see the arrow in FIG. 5), the leading edge is further form the axis $a$ than is the rear edge thereof.

In the use of the soil cultivating implement that has been described, its coupling member or trestle 12 is connected to the three-point lifting device or hitch at the rear of an agricultural tractor or other vehicle and the forwardly projecting input shaft of the gear box 5 is placed in driven connection with the power take-off shaft of the same tractor or other vehicle by way of the intermediate telescopic transmission shaft 7. The necessary adjustments of the change-speed gear 6 for the speed of rotation of the soil working members and of the level of the axis of rotation of the roller 11 to control the depth of penetration of the tines 140 or 149A into the soil are made having regard to the initial nature and condition of the soil that is to be cultivated and the degree of fineness of the soil that is desired after cultivation has been effected. Upon moving in the direction A over land that is to be cultivated, the soil working members are rotated in the directions that are indicated by arrows in FIG. 1 of the drawings and a single broad strip of land is worked by the implement since the strips of soil that are acted upon by the individual soil working members are each slightly greater in width than is the distance between the axes of rotation of immediately neighbouring shafts 2 so that the individual strips of soil overlap. When a construction in accordance with FIGS. 2 and 3 of the drawings is employed, the mounting of the tines 140 is such that they are capable of deflecting, during operation, about axes that are substantially perpendicular to the axis of rotation $a$, said axes being substantially tangentially disposed with respect to circles centered upon that axis $a$. This is possible because of the considerable degree of clearance that exists between the coils 137 and the pins 135 which they surround. This enables the tines 140 to deflect to avoid all but the most serious of obstacles, such as large stones, which they are likely to meet with in the soil. The arrangement of the supports 126 substantially wholly inside the chamber 121 that is defined principally by the wall 120 substantially avoids, or very greatly reduces, damage to the supports and the adhesion of soil and agricultural debris thereto.

When the embodiment of FIGS. 4 and 5 of the drawings is employed, each fastening portion 149 (including the parts 148) co-operates with the two pins 135 at opposite sides of the corresponding axis $a$ in such a way that the two tines 149A of each pair can also deflect, as may be required, about axes that are substantially perpendicular to the axis $a$. In this embodiment, the greater part of each tine operative portion 147 is torsionally twisted and this adds both to their effectiveness and to their deflectability. As in the preceding embodiment, it is only necessary to remove the two "safety" pins 136 to enable the pins 135 to be withdrawn, thus freeing the tines from their operative positions. This quick releasability enables any worn or damaged tines to be replaced very simply and very rapidly. As in the preceding embodiment, each support 142 is located substantially wholly inside the lower chamber of the hollow frame portion 1 that is defined principally by the wall 120 so that damage to, and soiling of, the supports 142 is substantially completely avoided or is reduced to a minimum.

Although certain features of the soil cultivating implement embodiments that have been described and/or that are illustrated in the accompanying drawings will be set forth in the following claims as inventive features, it is emphasised that the invention is not necessarily limited to those features and that it includes within its scope each of the parts of each embodiment that has been described, and/or that is illustrated in the accompanying drawings, both individually and in various combinations.

What we claim:

1. A soil-cultivating implement comprising a frame and at least one soil-working member supported on a hollow portion of said frame, said portion comprising three vertically spaced apart plates that define upper and lower chambers between a top and a central plate and between said central plate and a bottom plate, respectively, said soil-working member being rotatable about an upwardly extending shaft and driving means connected to said shaft to rotate same, said shaft being journalled within said portion and tool support means being connected to the shaft's lower portion, said support means including a hub that is substantially positioned entirely within the lower chamber, downwardly extending tool means connected to said support means and the lower side of said support means being flanged and fitted with minimal clearance in a hole in said bottom plate to exclude soil, said lower side being positioned at substantially the same level as the bottom plate and having connecting means fastened to at least one downwardly extending tine.

2. An implement as claimed in claim 1, wherein the cross section of the lower chamber is larger than that of the upper chamber.

3. An implement as claimed in claim 1, wherein said tool means comprises tines positioned at opposite sides of the axis of rotation of said soil working member.

4. An implement as claimed in claim 1, wherein the lower side of the support means is substantially circular.

5. An implement as claimed in claim 1, wherein said hub has stiffening ribs.

6. An implement as claimed in claim 5, wherein said ribs are located on the top of said hub.

7. An implement as claimed in claim 1, wherein said lower side has recesses and said tool means includes tines fastened in said recesses.

8. An implement as claimed in claim 1, wherein said shaft is rotatably supported from said upper and central plates by upper and lower bearings, said bottom plate being formed with an aligned hole to receive said hub.

9. An implement as claimed in claim 8, wherein said lower bearing is supported from the central plate and is located substantially midway along the length of said shaft.

10. An implement as claimed in claim 1, wherein a toothed pinion is secured to the upper portion of said shaft, said pinion being located in the upper chamber.

11. An implement as claimed in claim 10, wherein there are a plurality of soil working members mounted in a row, said members having toothed pinions that correspond to immediately neighbouring shafts in intermeshing engagement.

12. An implement as claimed in claim 1, wherein substantially all of said support means is located in said lower chamber.

13. An implement as claimed in claim 1, wherein both the central plate and the bottom plate have substantially horizontal central regions and said regions are flanked by corresponding upwardly and outwardly inclined flat portions.

14. An implement as claimed in claim 13, wherein both of said substantially horizontal portions are flanked at both the front and the rear, by corresponding upwardly and outwardly inclinded portions.

* * * * *